March 29, 1966 H. JOHANSSON 3,243,611

ARRANGEMENT FOR CONNECTION AND DISCONNECTION OF A LOAD

Filed May 27, 1963

Inventor
Hans Johansson
By Cushman, Darby & Cushman
Attorneys

United States Patent Office 3,243,611

Patented Mar. 29, 1966

3,243,611

ARRANGEMENT FOR CONNECTION AND DISCONNECTION OF A LOAD

Hans Johansson, Bandhagen, Sweden, assignor to Regulator AG., Glarus, Switzerland, a company of Switzerland Filed May 27, 1963, Ser. No. 283,471
Claims priority, application Sweden, May 30, 1962, 6,100/62
3 Claims. (Cl. 307—134)

The present invention relates to a connecting and disconnecting arrangement and particularly to an arrangement for connection and disconnection of a load with a constant period length and a constant on-off-ratio.

It is often necessary to feed such connecting and disconnecting arrangements by various types of supply sources, such as accumulators, charging sets or direct current generators. Furthermore, in many cases the load upon the supply source is greatly varying, which often involves difficult problems in maintaining a constant period length and a constant ratio of connection to disconnection.

According to the invention the difficulties associated with such arrangements are eliminated by means of a circuit comprising a means fed by a supply source, which means is arranged to control the connection and disconnection of the load circuit, a zener diode and a T-filter being connected in parallel to said means for stabilizing its output signal. A capacitor forms the parallel branch of the filter, and the invention is characterised in that one series branch of the filter which is connected to one terminal of the load circuit, consists of an unsymmetrically conductive member so directed that the permitted current direction involves charging of the capacitor, and in that the other branch consists of an ohmic resistor.

Figure 1:
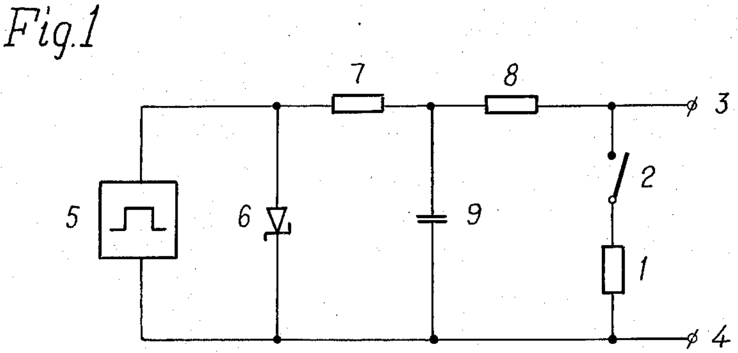
Figure 2:
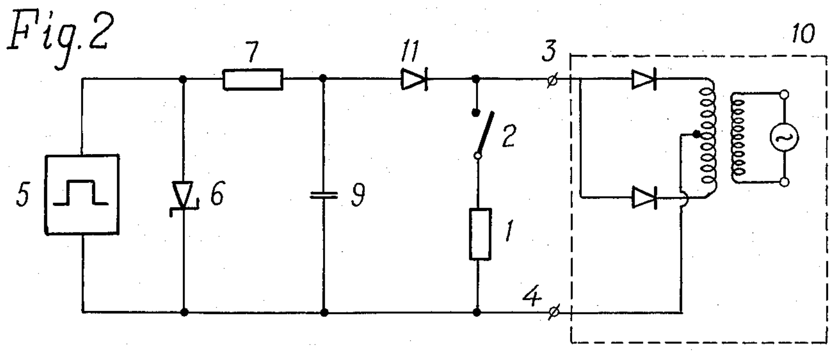

The invention will now be more closely described with reference to the accompanying drawing, in which FIG. 1 shows a circuit arrangement of a kind known before, and FIG. 2 shows the modification according to the invention.

In FIG. 1, 1 designates a load object which by means of a switch 2 can be connected to or disconnected from a supply source having the terminals 3 and 4. The switch 2 receives control voltage from a pulse generator 5 fed by the supply source. In order to maintain said control voltage constant a zener diode 6 is connected across said pulse generator. For the same purpose there is also provided a suitably dimensioned filter consisting of the resistors 7 and 8 and a capacitor 9, said filter being connected across the pulse generator and between the same and the supply source.

The connection and disconnection of the load means an extremely uneven loading of the supply source which makes it difficult to stabilize the voltage across the zener diode and to maintain the control voltage supplied by the pulse generator constant. Therefore the capacitor 9 is connected into the circuit in such a manner that it is charged during the periods when the switch 2 is open, and then is discharged during the periods when the switch is closed. The discharge will take place partly through the resistor 8 and the load circuit, partly through the resistor 7 and the pulse generator, it being important that the discharge through the load circuit does not become that heavy that the voltage across the zener diode drops below the permissible working voltage, and therefore the resistors 7 and 8 and the capacitor 9 must be dimensioned with regard thereto. As the periods often may be of the order of several seconds, it is apparent that the resistors must be great or the capacitor must be great. However, in the practice it proves impossible to make the resistors greater than approximately 100 ohms, and therefore the capacitor must be made very great, often of the order of 2000 $\mu$f.

In order to eliminate the drawbacks of a great capacitor, the modification of the above-described circuit, shown in FIG. 2 is suggested. Therein the supply source is shown as a regular charging set 10 in which an input A.C. voltage is rectified and is fed into the load circuit in time to the closing and breaking of the switch 2. Moreover, the resistor 8 has been replaced by a diode 11. With this arrangement, viz. having a diode connected between the capacitor 9 and the load circuit, it is attained that the discharge of the capacitor through the load circuit is eliminated, since the diode is so directed that it is conductive merely in the direction of current in which the capacitor is charged. Because the main part of the discharge according to FIG. 1 takes place through the resistor 8 and the load circuit, and the discharge through the resistor 7 and the pulse generator is small in comparison thereto, it is apparent that the introduction of a diode having a very great blocking resistance, in lieu of the resistor 8 causes a comparatively slight discharge of the capacitor 9. This involves that the capacitor of the circuit of FIG. 2 can be held at the order of 200 $\mu$f. which means a considerable cost reduction.

Concerning the load 1 it is remarked that in a practical instance the same may consist of a group of magnetically controlled valves which are to be connected periodically to the supply source and which may use a current of the order of 10 amperes, this being the case e.g. in connection with milking machines.

Of course, the invention is not restricted to the embodiment shown in the drawing, but may be varied as to its details within the scope of the invention. Thus for instance, the supply source may be of any type and the shown switch may be of a mechanical or electronic design.

I claim:

1. Arrangement for connecting and disconnecting a load circuit, comprising a supply source and a means fed by the supply source, said means being arranged for controlling by means of a switch in the load circuit, the connection and disconnection of said load with a constant time interval and a constant on-off-ratio, a member and a T-filter being connected in parallel to said means for stabilizing its output signal, and a capacitor forming the parallel branch of said filter, one series branch of the filter which is connected to one terminal of the load circuit, consisting of an unsymmetrically conductive member so directed that the permitted current direction involves charging of the capacitor, and the other series branch consisting of an ohmic resistor.

2. A circuit arrangement comprising: a current supply source, a load, a switch for connecting and disconnecting said load to and from said source, a pulse generator for controlling said switch so as to connect and disconnect said load with a constant predetermined frequency and a constant predetermined on-off-ratio, said pulse generator being supplied with current in common to the load from said source, a filter being inserted between said pulse generator and said load, said filter comprising a series resistive branch and a parallel capacitive branch, and a unidirectionally conductive member being connected between one pole of said source and the connection point of said filter branches.

3. A circuit arrangement as claimed in claim 2, further comprising a zener diode connected in parallel to said pulse generator.

No references cited.

ORIS L. RADER, *Primary Examiner.*

W. SHOOP, *Assistant Examiner.*